United States Patent [19]

Yamada

[11] Patent Number: 4,529,276
[45] Date of Patent: Jul. 16, 1985

[54] IMAGE ROTATING OPTICAL SYSTEM

[75] Inventor: Yu Yamada, Kokubunji, Japan

[73] Assignee: Canon Kabushiki Kaisha, Tokyo, Japan

[21] Appl. No.: 447,150

[22] Filed: Dec. 6, 1982

[30] Foreign Application Priority Data

Dec. 9, 1981 [JP] Japan .................. 56-199126

[51] Int. Cl.³ ............................................. G02B 27/02
[52] U.S. Cl. ........................................ 350/445; 350/6.4
[58] Field of Search ............................ 350/445, 6.4

[56] References Cited

U.S. PATENT DOCUMENTS 3,099,748 7/1963 Weiss ............................. 350/6.4
3,724,927 4/1973 Cox ............................... 350/445

OTHER PUBLICATIONS

G. Schroder, "Technische Optik", second edition, pp. 40 and 76.

Primary Examiner—John K. Corbin
Assistant Examiner—Rebecca D. Gass
Attorney, Agent, or Firm—Fitzpatrick, Cella, Harper & Scinto

[57] ABSTRACT

An image rotating optical system provided with an imaging optical element for forming an image, an image rotating optical element rotatable about the optical axis of the imaging optical element to rotate the light beam therefrom, and a light shield element positioned between the imaging optical element and the image rotating optical element and rotatable about the optical axis with the rotation of image rotating optical element, to correct the unevenness in the illuminance caused by the image rotating optical element.

4 Claims, 8 Drawing Figures

FIG. 1 PRIOR ART
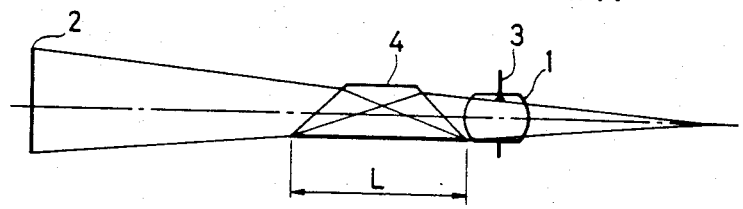
FIG. 2 PRIOR ART
FIG. 3
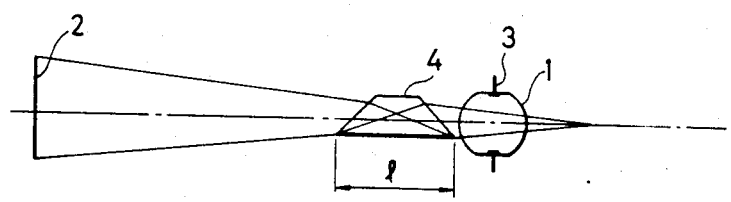
FIG. 4A   FIG. 4B   FIG. 4C
  

IMAGE ROTATING OPTICAL SYSTEM

BACKGROUND OF THE INVENTION

1. Field of the Invention

The present invention relates to an image rotating optical system capable of rotating the position of an image with respect to the optical axis, adapted for use for example in a microfilm reader or a microfilm reader-printer.

2. Description of the Prior Art

An optical system capable of arbitrarily rotating the position of an image about the optical axis of the imaging system is desired in various applications, for example a microfilm reader and a microfilm reader-printer. The image on a microfilm is usually recorded in a normal position but often is recorded in a vertically inverted position, and such an inverted image has to be corrected to the normal position by suitable means.

In order to rotate the image about the optical axis of an imaging system, there is already known an optical element for reflecting the light beam an odd number of times, and the rotation of a projected image can be achieved by rotating such optical element. FIG. 1 shows an image rotating optical system utilizing a dove prism as an image-rotating optical element of single reflection type, wherein are illustrated a projection lens 1, a screen 2, a pupil 3 of said projection lens facing said screen and passing a circular light beam as shown in FIG. 2, a dove prism 4 constituting the image-rotating optical element and provided with such a dimension as to accept the entire light beam passing through the pupil 3 without causing any eclipse in said beam. The light beam from said projection lens 1 is projected onto the screen 2 through the dove prism 4, wherein the image on the screen can be rotated by rotating said prism about the optical axis of the projection lens. Such image rotating element of odd-number-times of reflection type tends, however, to require long faces along the axial direction of the imaging system, thus leading to a larger dimension of such element and to an increased production cost. A smaller image rotating element, particularly reduced in the axial length L, is desirable in consideration of the geometrical design of the optical system and also of the production cost, but it has been found that such reduction in size leads to an uneven illuminance in the projected image.

SUMMARY OF THE INVENTION

An object of the present invention is to provide an image rotating optical system capable of providing an image with uniform illuminance even with a small image rotating optical element.

The image rotating optical system of the present invention includes an imaging optical element for forming an image, an image rotating optical element reduced in dimension and rotatable about the optical axis of said imaging optical element, and a light shield element positioned between said imaging optical element and said image rotating optical element and rotated in synchronism with said image rotating optical element. The shield element is provided to correct or compensate for the unevenness in the illuminance resulting from partial eclipse, by said image rotating optical element, of the light beam emerging from the pupil of said imaging optical element.

The present invention will hereinafter be explained by embodiments thereof utilizing the dove prism as the image rotating optical element as in the foregoing conventional examples, but it is to be understood that the present invention is applicable to any image rotating optical element causing odd-number-times of light reflection and having a flat face along the optical axis of the imaging optical element, such as the Abbe's prism for three reflections or the Vee's block prism for five reflections. Also the image rotating optical element is not limited to prisms. As an example, the Abbe's prism can be replaced by three mirrors.

BRIEF DESCRIPTION OF THE DRAWINGS

FIG. 1 is a schematic view showing an example of a conventional image rotating optical system;

FIG. 2 is a view showing the light beam flux passing the pupil of the projection lens system and directed to the dove prism in the optical system shown in FIG. 1;

FIG. 3 is a view showing the optical path of the optical system when the dove prism shown in FIG. 1 is reduced in dimension in the axial direction;

FIGS. 4A, 4B and 4C illustrate the states of eclipse, caused by the dove prism, in the light beam emerging from the pupil of the projection lens and reaching the image plane in the optical system shown in FIG. 3;

DESCRIPTION OF THE PREFERRED EMBODIMENTS

FIG. 3 shows the optical path of the optical system, wherein the dove prism 4 shown in FIG. 1 is shortened in the axial direction. The light beam passing the pupil 3 of the projection lens 1 is partially eclipsed by such reduced prism as shown in FIGS. 4A, 4B and 4C, wherein the portion of light beam emerging from said pupil and transmitted by the prism is indicated by a hatched area. The extent of said eclipse varies according to the positional relationship between the prism and the projection lens, but the portion of light beam emerging from said pupil and transmitted by said prism is generally represented by an area defined by straight lines and arcs.

Figure 5:
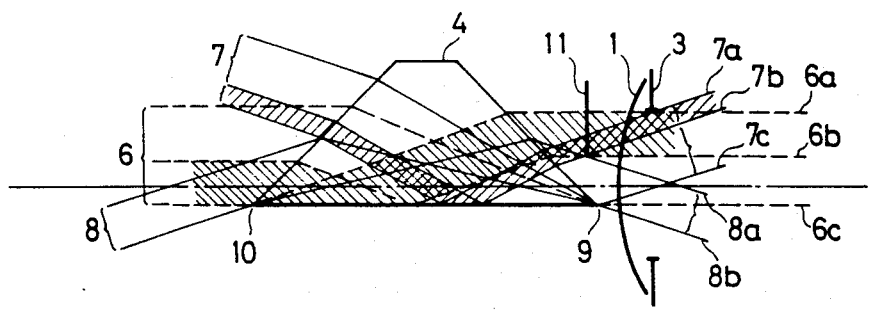
FIG. 5 is a view showing an embodiment of the image rotating optical system of the present invention.

FIG. 5 shows an embodiment of the image rotating optical system of the present invention, and also shows the manner of occurrence of unevenness in the illuminance resulting from partial eclipse of the light beam from the projection lens by the dove prism. In FIG. 5, prism edges 9, 10 are positioned on a lower face of the prism and are perpendicular to the optical axis of the projection lens 1. Designated by 6 are light beams entering the projection lens in the direction parallel to the optical axis thereof and transmitted by the prism 4, while 6a and 6c represent peripheral rays defined respectively by the pupil of the projection lens 1 and by the prism edge 9. Oblique light beams 7, 8 are at the limits maximum of view for the beams emerging from the prism 4 toward the screen, wherein peripheral rays 7a, 7c of the beam 7 are defined respectively by the pupil of the projection lens and by the prism edge 9. Also the peripheral rays 8a, 8b of the beam 8 are defined respectively by the prism edge 10 and by the prism edge 9.

As shown in FIG. 5, when a reduced prism 4 partly eclipses the light beams emerging from the pupil 3 of the projection lens 1, generally, the angle of view is greater in the off-axis beams 8 while a greater amount of light is transmitted in the on-axis beams 6 and in the oblique beams 7. More specifically, the quantity of light corresponding to the beams between 6a and 6b of the on-axis beam flux 6, and the quantity of light corresponding to the beams between 7a and 7b of the oblique beam flux 7 are greater than that of the oblique beam flux 8. Consequently, an image formed on the screen under these conditions shows an uneven distribution of illuminance. According to the present invention, such uneven distribution in illuminance is corrected by guiding the entire off-axis beam flux 8 to the prism 4, while positioning what may be termed a light shield element, diaphragm or light shield element 11, having an aperture 13 therein, which light shield element 11 for effectively intercepting beams between 6a and 6b of the on-axis beam flux 6 and beams between 7a and 7b, of the off-axis beam flux 7.

In order to achieve the above-mentioned object, said shield 11 has to be positioned between the projection lens 1 and the dove prism 4. Since said prism is rotated, while being maintained in such state, about the optical axis of the projection lens, the diaphragm 11 is so constructed as to rotate about said optical axis in synchronism with said prism.

Figure 6:
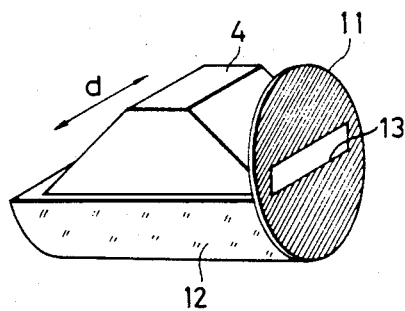
FIG. 6 is a perspective view showing an embodiment of the image rotating optical system of the present invention in which the dove prism and the diaphragm are integrally united.

FIG. 6 is a perspective view of an embodiment in which the dove prism 4 and the diaphragm 11 are integrally united. The dove prism 4 is mounted on a semi-cylindrical support member 12, on an end of which the diaphragm 11 is fixed, thereby enabling simultaneous rotation of the prism 4 and the diaphragm 11 about a predetermined axis.

Although a reduction in the axial length of the dove prism gives rise to a certain loss in the amount of light, such loss can be compensated by increasing the dimension of prism in a direction d in FIG. 6 perpendicular to the optical axis of the prism and by using a decreased F-number of projection lens 1. Such projection lens is inevitably somewhat larger but the entire optical system can be made more compact, since the substantial reduction in size of the dove prism can sufficiently cover the minute increase in size of the projection lens.

What I claim is:

1. An image rotating optical system comprising:
   an imaging optical element for forming an image;
   an image rotating optical element rotatable about the optical axis of said timing optical element to rotate a light beam flux from said imaging optical element; and
   a light shield element positioned between said imaging optical element and said image rotating optical element and rotatable about the optical axis of said imaging optical element with the rotation of said image rotating optical element.

2. An image rotating optical system according to claim 1, wherein said light shield element and said image rotating optical element are integrally united.

3. An image rotating optical system comprising:
   a projection lens system for forming an image on a predetermined plane;
   a prism rotatable about the optical axis of said projection lens system to rotate a light beam flux from said projection lens system; and
   a light shield element positioned between said projection lens system and said prism for shielding, with respect to beams emerging from the pupil of said projection lens system and transmitted through said prism, a greater part of on-axis beams as compared with off-axis beams, said light shield element being rotatable about the optical axis of said projection lens system.

4. An image rotating optical system according to claim 3, wherein said prism and said light shield element are integrally formed and are rotatable about the optical axis of the projection lens system while maintaining a fixed mutual relationship therebetween.

* * * * *

UNITED STATES PATENT AND TRADEMARK OFFICE
CERTIFICATE OF CORRECTION

PATENT NO. : 4,529,276
DATED : July 16, 1985
INVENTOR(S) : YU YAMADA

It is certified that error appears in the above-identified patent and that said Letters Patent is hereby corrected as shown below:

Column 2, line 62, change "limits maximum" to --maximum limits--.

Column 3, line 39, insert --the-- before "prism".

Column 4, line 10, change "timing" to --imaging--.

Signed and Sealed this

Eighteenth Day of February 1986

[SEAL]

Attest:

DONALD J. QUIGG

Attesting Officer

Commissioner of Patents and Trademarks